United States Patent [19]

Egawa et al.

[11] Patent Number: 5,546,251

[45] Date of Patent: *Aug. 13, 1996

[54] FLOATING MAGNETIC HEAD HAVING A MAGNETIC HEAD CORE WITH A BALANCED WINDING BONDED TO A SLIDER SIDE SURFACE

[75] Inventors: Motoji Egawa; Kazutoshi Takayanagi; Akio Takayama; Tetsuji Fujita; Akinobu Sano, all of Shizuoka-ken, Japan

[73] Assignee: Minebea Co., Ltd., Nagano-ken, Japan

[*] Notice: The term of this patent shall not extend beyond the expiration date of Pat. No. 5,349,487.

[21] Appl. No.: 389,055

[22] Filed: Feb. 15, 1995

Related U.S. Application Data

[62] Division of Ser. No. 59,297, May 11, 1993, abandoned.

[30] Foreign Application Priority Data

| May 28, 1992 | [JP] | Japan | 4-162005 |
| Aug. 27, 1992 | [JP] | Japan | 4-252147 |
| Aug. 28, 1992 | [JP] | Japan | 4-254169 |
| Nov. 11, 1992 | [JP] | Japan | 4-326060 |

[51] Int. Cl.$^6$ .................................................. G11B 5/60
[52] U.S. Cl. .................................................. 360/103
[58] Field of Search .................................. 360/102–103, 360/104

[56] References Cited

U.S. PATENT DOCUMENTS

| 3,229,268 | 1/1966 | Solyst | 360/103 |
| 4,393,428 | 7/1983 | Fujimura | 360/123 |
| 4,488,195 | 12/1984 | Yanagiuchi et al. . | |
| 4,682,254 | 7/1984 | Hashimoto et al. . | |
| 4,711,018 | 12/1987 | Matsuzawa . | |
| 4,745,507 | 5/1988 | Otomo et al. . | |
| 4,870,520 | 9/1989 | Shaw | 360/103 |
| 4,870,521 | 9/1989 | Okabayashi . | |
| 5,021,910 | 6/1991 | Murakami . | |
| 5,043,833 | 8/1991 | Aikawa et al. . | |
| 5,091,810 | 2/1992 | Kakizaki et al. | 360/103 |
| 5,136,444 | 8/1992 | Maki et al. | 360/103 |
| 5,301,077 | 4/1994 | Yamaguchi et al. . | |
| 5,349,487 | 9/1994 | Egawa et al. | 360/103 |
| 5,359,479 | 10/1994 | Karam II | 360/103 |
| 5,359,481 | 10/1994 | Egawa | 360/103 |

FOREIGN PATENT DOCUMENTS

| 0075927 | 4/1987 | Japan | 360/103 |
| 0276421 | 11/1989 | Japan | 360/103 |
| 209617 | 9/1991 | Japan . | |
| 4028010 | 1/1992 | Japan | 360/103 |
| 222916 | 8/1992 | Japan . | |

*Primary Examiner*—Robert S. Tupper
*Assistant Examiner*—Brian E. Miller
*Attorney, Agent, or Firm*—Oliff & Berridge

[57] ABSTRACT

A floating magnetic head comprising a slider and a head core integral with the slider. The slider is made of a nonmagnetic material such as barium titanate or calcium titanate. The slider has rails on its surface opposite to a magnetic recording medium to produce a floating force. The head core has a read/write gap. The head core is equipped with a winding. The core is disposed on the outside of the slider and has a tapering thickness.

3 Claims, 7 Drawing Sheets

FLOATING MAGNETIC HEAD HAVING A MAGNETIC HEAD CORE WITH A BALANCED WINDING BONDED TO A SLIDER SIDE SURFACE

This is a Division of application Ser. No. 08/059,297 filed May 11, 1993, now abandoned.

BACKGROUND OF THE INVENTION

1. Field of Invention

The present invention relates to the improvement in a floating magnetic head used in a hard disk drive and, more particularly, to improvements in a floating magnetic head of the composite type.

2. Description of the Prior Art

A floating magnetic head of the composite type which has heretofore frequently been used is generally indicated by reference numeral 1 in FIG. 11. This floating magnetic head 1 comprises a slider 2 made of barium titanate or calcium titanate together with rails 3 and 4 disposed on opposite sides of the slider 2. The top surfaces of the rails 3 and 4 form floating surfaces.

One rail 3 has a slit of a given depth, the slit 5 extending in a direction perpendicular to the direction M in which a magnetic recording medium (not shown) moves. A magnetic head core 6 made of a ferromagnetic substance such as a ferrite is inserted in the slit 5. The magnetic head core 6 is rigidly mounted by sealing of glass or by other means.

Indicated by reference d is the track width. The slider 2 is provided with two cutouts 7 and 8 forming a window. A coil 9 is wound on one portion of the magnetic head core 6 which is exposed to the window.

In the conventional floating magnetic head 1 shown in FIG. 11, the magnetic head core 6 is treated as an independent part until it is inserted into the slit 5, and therefore, it has been difficult to reduce the thickness of the core below 100 microns without breakage. To cope with high frequency signals, the eddy current loss of the core must be made small and therefore the magnetic head core 6 must be made thinner. However, this thinning has been very difficult to accomplish.

Also, it has been necessary to measure the depth of a R/W(Read/Write) gap of the magnetic head core 6 sealed with glass. To adjust the depth of the R/W gap, it has been necessary to make a measurement obliquely via the glass inside the slit 5. In this case, the measurement is very much affected by the refractive index of the glass or local distortion in the glass.

In recent years, the recording track width d has been reduced below 10 microns. Therefore, the ratio of the amount of the glass filled in the top portion of the slit 5 to the recording track width increases. Consequently distortion due to differences in thermal expansion coefficients among the glass, the slider, and the magnetic head core 6 (often consisting of a ferrite) increases, thus deteriorating the magnetic characteristics of the magnetic head core 6.

Thus, to make the magnetic head core 6 cope with high frequency signals, the thickness of the head core 6 has to be reduced, and therefore, it is necessary to reduce the width of the slit 5. As a result, it has been difficult to make the slit beyond 1 mm in depth keeping the width less than 100 microns. If the thickness of the magnetic head core is decreased while keeping the slit wide, the amount of glass filled would be increased, thus further increasing the characteristic variations due to the differences in thermal expansion coefficients. Another problem is that it is difficult to fill the glass without creating a void between the slider 2 and the magnetic head core 6 and without producing bubbles.

SUMMARY OF THE INVENTION

It is a first object of the present invention to provide a floating magnetic head which is free of the foregoing problems with the prior art techniques, is easy to fabricate, and has excellent high frequency characteristics.

This object is achieved by a first embodiment which is described later in connection with first and second examples of the invention.

A second embodiment of the invention is an improvement over the first embodiment. In particular, the magnetic head core 6 is exposed, and the winding 9 is mounted an the exposed magnetic head core. In this case, the winding 9 tends to be disarranged. The disarranged winding 9 may come into contact with the magnetic disk, resulting in electrical leakage, breakage, or other trouble. Generally, a bobbin (not shown) is used to prevent the winding from being disarranged or to prevent layer short between the wire of the winding 9 and the magnetic head core 6. However, there arises the possibility that the magnetic head core 6 is damaged by the bobbin because the core is very thin. Accordingly, it is a second object of the invention to provide a floating magnetic head which has a reinforced magnetic head core to prevent the damage and suppress disarrangement of the winding 9, thus preventing electrical leakage and breakage.

Conventionally, in floating a magnetic head, a CSS (Contact Start Stop) system is employed, in which the magnetic head is floated by 0.1–0.3 μm from the recording medium surface while the recording medium such as a disk rotated at high speed and the sliding surface of the magnetic head 1 comes into contact with a surface of the recording medium when it stops. During the CSS operation the surface of the recording medium could be damaged by the edge portion 19 of the slider 2 illustrated in FIG. 1. It is desired to avoid such damage, i.e. to increase the characteristics of CSS.

To solve the problem, there have been ideas to chamfer the edge portions 19 of the slider 2; however, it may also chamfer the edge of the magnetic head core 6 at the same time, which deteriorates the recording track width t in FIG. 1.

Accordingly, the third object of the present invention is to provide a floating magnetic head with improved CSS characteristics without deteriorating its recording track width.

The first object is achieved by a floating magnetic head comprising: a substantially rectangular slider made of a nonmagnetic material and having leading and trailing ends, the slider being provided with a window and rails mounted on a surface of the slider which is opposite to a magnetic recording medium that produces a floating force; and a magnetic head core located on the one side of the slider and having first and second legs, the second leg being located at the trailing end of the slider such that the first leg is located toward the direction of the leading end of the slider, the magnetic head core having a read/write gap.

The first object is also achieved by a floating magnetic head comprising: a slider made of a nonmagnetic material and having rails on its surface opposite to a magnetic recording medium to produce a floating force; a magnetic head core which has a read/write gap and is bonded to the outside of the slider; and a support member that supports the winding on the magnetic head core and is banded to the magnetic head core on the opposite side of the slider.

In one feature of the invention, the support member is provided with a recess receiving the winding on the magnetic head core. The support member and the slider may be made of the same material. Also, the support member may be partially cut out so that the apex of the magnetic head core can be exposed. Furthermore, the support member may be provided with a cover that is so shaped that it covers the corners of the legs of the magnetic head core.

In order to achieve the second object, in a floating magnetic head comprising a slider made of a nonmagnetic material and having rails on its surface opposite to a magnetic recording medium to produce a floating force, and a magnetic head core which is integral with the slider, has a read/write gap, and is disposed on the outside of the slider, the magnetic head is characterized in that the edge portion of the floating surface of the slider is chamfered.

DESCRIPTION OF THE PREFERRED EMBODIMENTS

Figure 1:
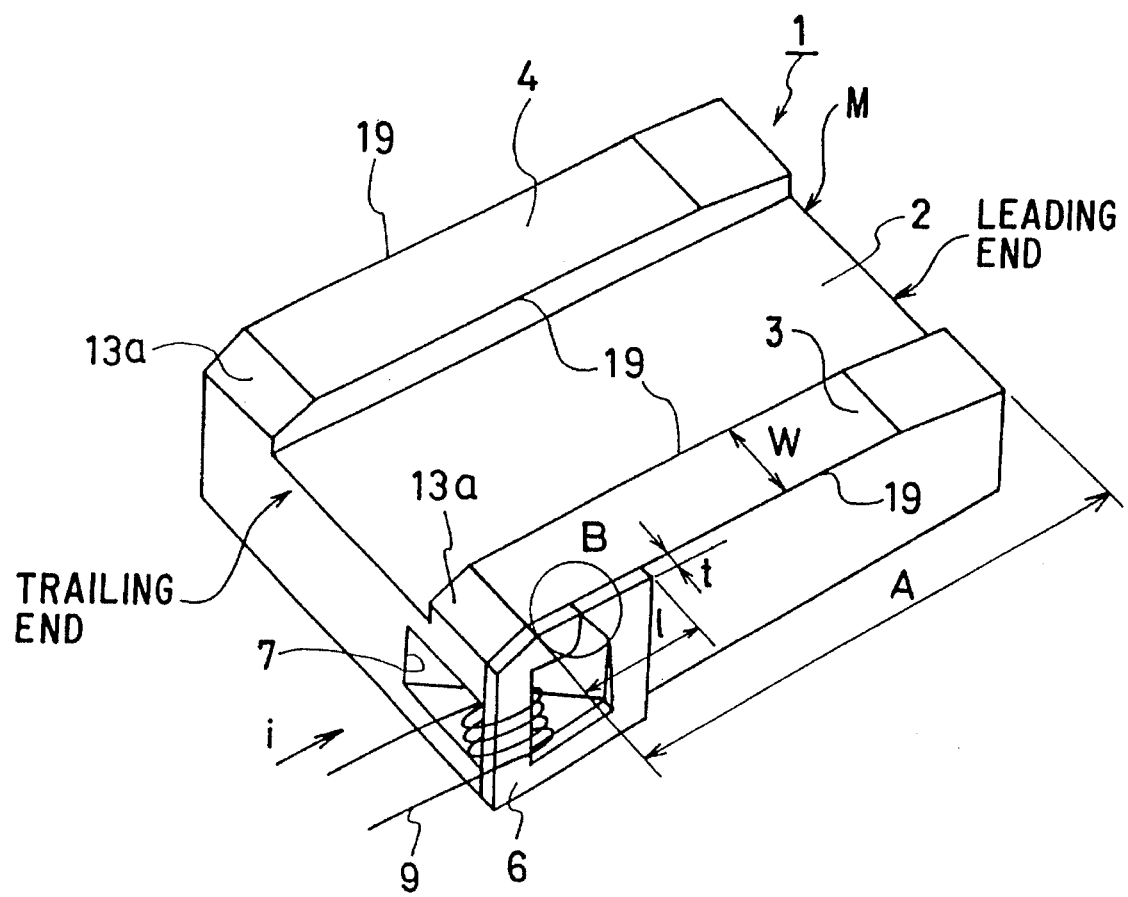
FIG. 1 is a perspective view of a first example of magnetic head according to the invention.

A first example of the present invention is now described by referring to FIG. 1. It is to be noted that like components are indicated by like references numerals in various figures. A feature of the fundamental structure of the novel magnetic head is that the magnetic head core 6 is mounted on the outside of the slider 2, i.e., at one side of the rail 3. Therefore, the rail 3 is provided with no slit. The slider 2 is made of an oxide ceramic or other material. The material of the slider 2 is selected, taking account of the hardness, the coefficient of thermal expansion, the density, and the abrasiveness against a magnetic recording medium and other factors. Generally, the slider 2 is often made of a ceramic of calcium titanate.

In this example, the thickness t of the magnetic head core 6 exposed to the rail surface is chosen to be less than one seventh of the rail width W of the slider 2. The length I of the magnetic head core 6, or the dimension of the core taken in the direction M in which a magnetic recording medium moves, is set to be less than one half of the length A of the slider 2 taken in the direction of movement of the magnetic recording medium.

The magnetic head core 6 and the slider 2 are substantially identical in height. The magnetic head core 6 is made of a magnetic ferrite.

In the floating magnetic head 1 constructed in this way, the head core 6 is magnetized by passing an electrical current i through the coil 9. Information is written to a magnetic disk media (not shown) or read from the magnetic disk media by this magnetization. The floating magnetic head 1 is the same as the prior art floating magnetic head in these fundamental points but produces the following feature due to its novel structure.

Since the magnetic head core 6 is mounted on the outside of the slider 2, it is not necessary to form a thin slit in the slider 2. Also, because the magnetic head core 6 is firmly bonded to the side of the slider the magnetic head core can be machined into a thin form without breakage after being adhesively bonded to the slider 2; therefore the magnetic head with a core which is much thinner than conventional cores can be manufactured with a high production yield. Consequently, a magnetic head core which produces a lower amount of eddy current loss and can accommodate high frequency signals can be fabricated.

With respect to the bonding of the magnetic head core 6 to the slider 2, a thin adhesive layer of a thickness on the order of several microns or less can be readily obtained by forming a thin glass film on the slider by sputtering techniques. Furthermore, the depth of R/W gap f can be measured directly from the side of the slider, because the magnetic head core 6 is mounted on the outside.

Figure 2:
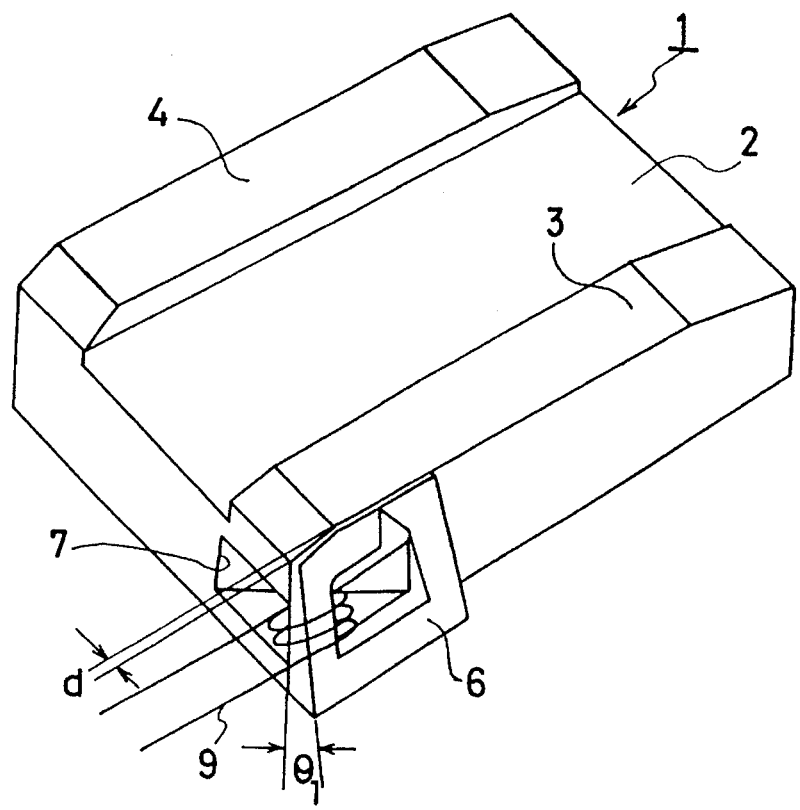
FIG. 2 is a perspective view of a second example of magnetic head according to the invention.

Referring to FIG. 2, there shown is a second example of the invention. In this example, the side surface of the magnetic head core 6 that is opposite to the surface bonded to the slider 2 is cut out obliquely and has a specified recording track width at the surface facing a magnetic recording medium.

Instead of forming the side surface obliquely, it can be formed like steps or stairs. In this example, after adhesively bonding the magnetic head core 6 to the side surface of the slider 2, the magnetic head core 6 can be machined obliquely at an angle of θ, (θ$_1$, is within the range from 1 degree to 10 degrees) to bring the front end into agreement with a specified track width.

In addition to the numerous features described above, the amount of glass used is minimum compared to conventional methods, and therefore the effect of the glass is negligible.

To cut the track, micromachining techniques such as ion milling from the side surface can be utilized to improve the accuracy of the track width.

Figure 3:
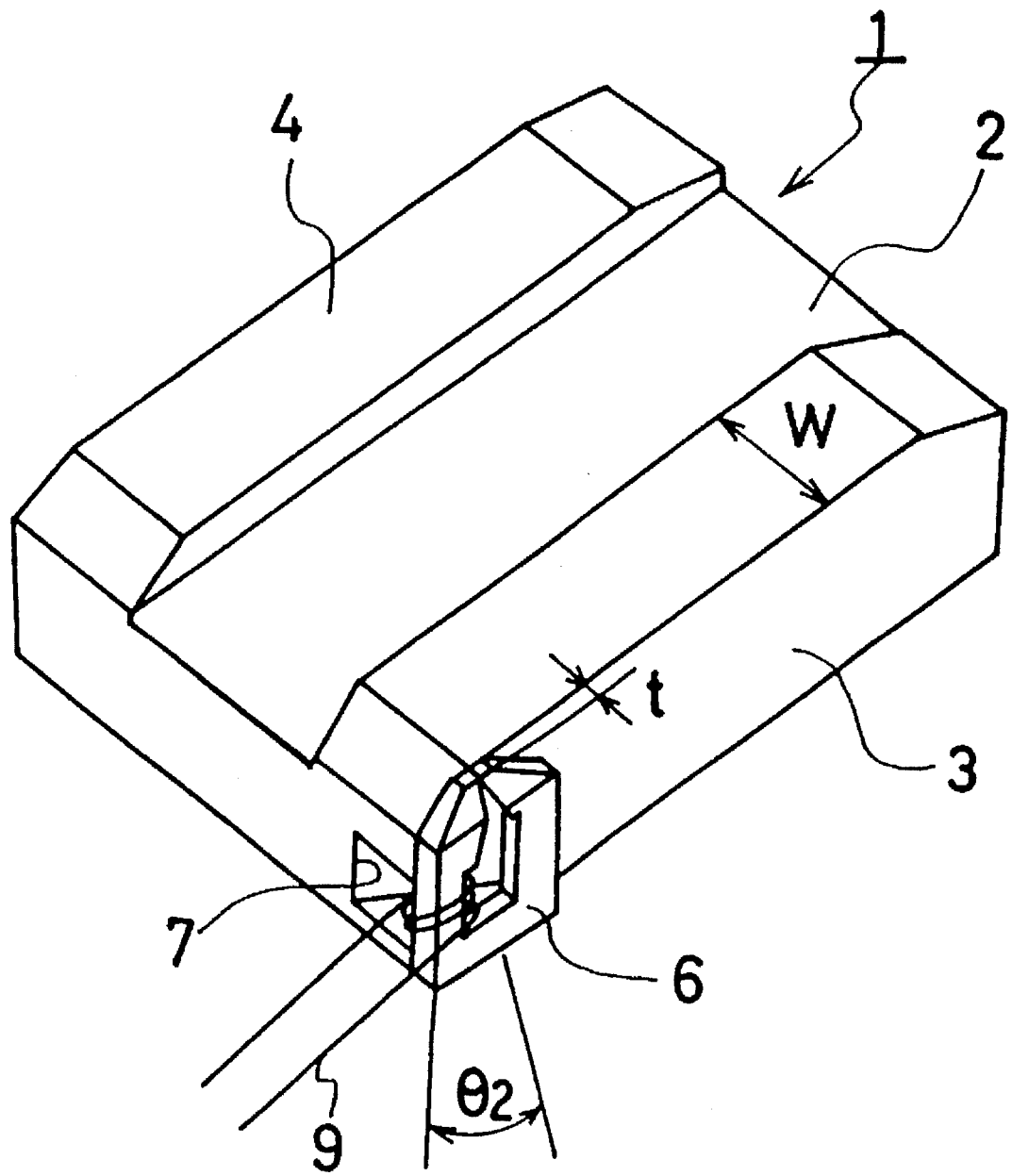
FIG. 3 is a perspective view of a third example of magnetic head according to the invention.

Referring to FIG. 3, there is shown a third example of the invention. In this example, only that portion of the side surface of the magnetic head core 6 which is close to the magnetic recording medium is obliquely cut out. This side surface is made coincident with the track width at the surface facing a magnetic recording medium. Instead of forming the side surface obliquely, it can be formed like steps or stairs.

In this example, after bonding a core to the side of the slider 2, the magnetic head core 6 can be machined obliquely at an angle of $\theta_2$ ($\theta_2$ is within the range from 15 degrees to 45 degrees to bring the front end into agreement with the track width).

Figure 4:
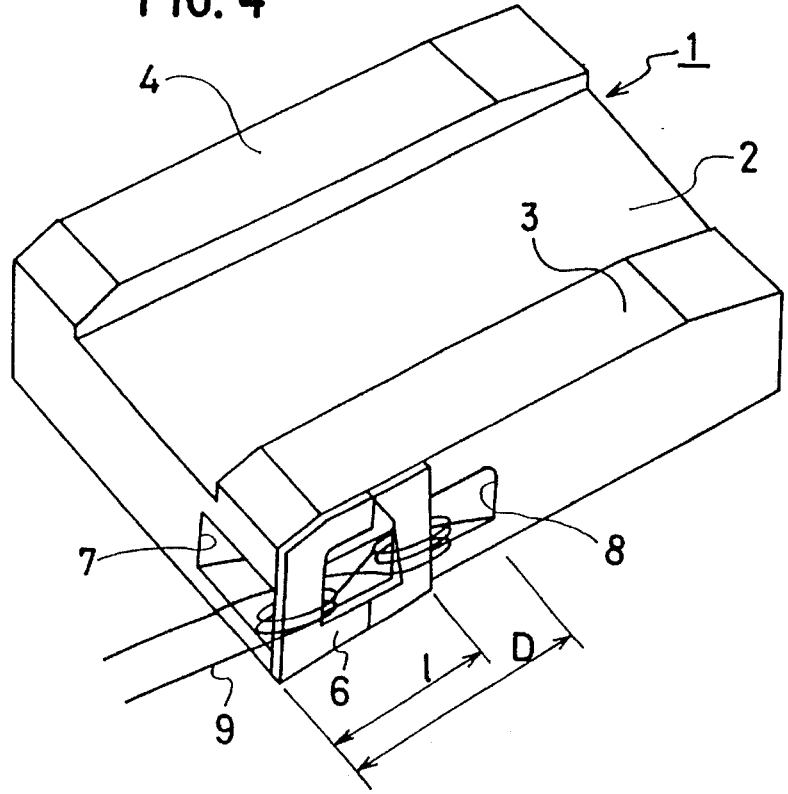
FIG. 4 is a perspective view of a fourth example of magnetic head according to the invention.

Referring to FIG. 4, there is shown a fourth example of the invention. In this example, the slider 2 has a cutout portion forming a window 8. The length D of this window 8 is in excess of the length 1 of the magnetic head core 6 taken in the direction of movement of the magnetic recording medium.

Thus, the coil 9 can be wound on both legs of magnetic head core 6. This structure yields the aforementioned features. In addition, the coil 9 can be wound in opposite senses on the legs of the magnetic head core 6 and, therefore, the effect of an external magnetic field can be cancelled out.

Furthermore, the amplitude of output signal per turn of the coil can be increased, since the coil 9 makes a more intimate contact with the magnetic head core 6.

Figure 5:
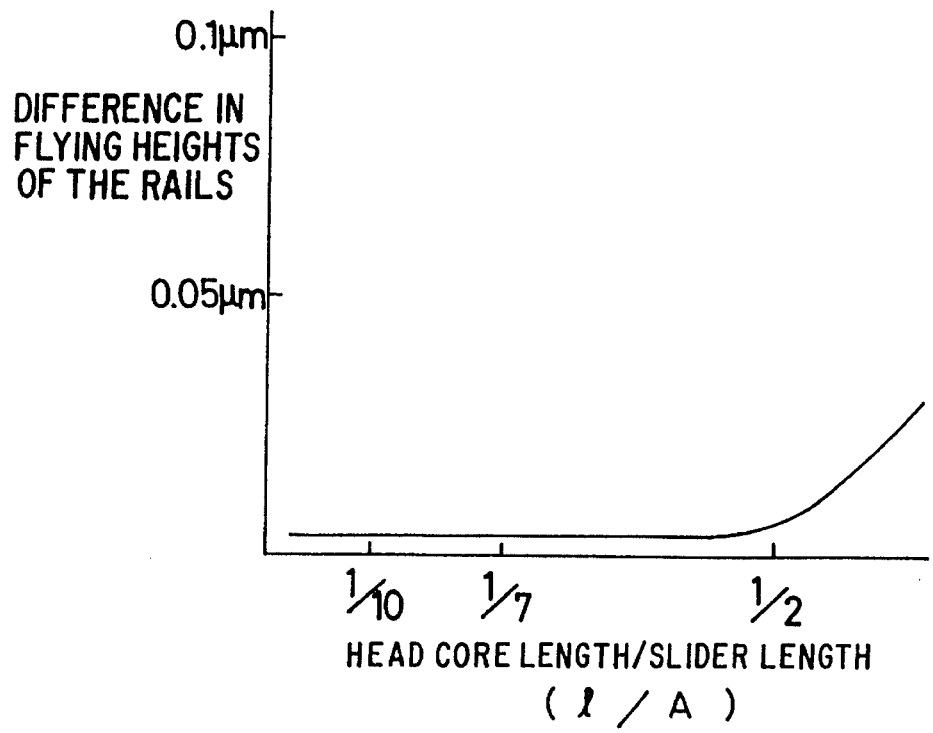
FIG. 5 is a graph showing the relation between the ratio of the head core width and the slider width and the difference of the flying heights between two rails.
Figure 6:
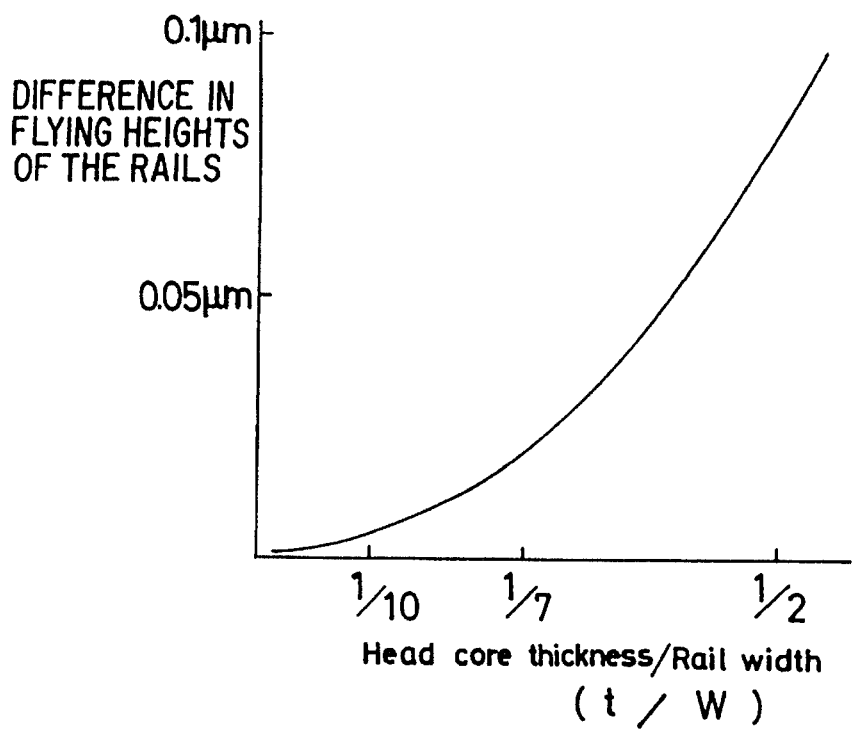
FIG. 6 is a graph showing the relation between the ratio of the magnetic head core thickness and the rail width and the difference of the flying heights between two rails.

FIG. 5 is a graph in which the ratio of the length 1 of the head core exposed to the rail surface to the slider length A is plotted on the horizontal axis, while the difference of the flying heights of the two rails is plotted on the vertical axis. FIG. 6 is a graph in which the ratio of the thickness t of the magnetic head core exposed to the rail surface to the rail width W is plotted on the horizontal axis, while the difference of the flying heights of the two rails is plotted on the vertical axis. It can be seen from FIG. 5 that the difference becomes constant at a small l/A ratio.

In the novel floating magnetic head described above, the magnetic head core protrudes from the side of the slider 2, thus creating a possibility of a difference between the two rail widths. However, no practical problems arise if the thickness of the magnetic head core 6 exposed to the rail surface is reduced to such an extent that the thickness of the magnetic head core 6 can be neglected compared with the rail widths. Experiments show that problems by no means occur if the thickness is less than one seventh of the rail width and the width of the magnetic head core 6 exposed to the rail surface is less than one half of the width of the slider 2, as shown in FIG. 5 and 6.

The advantages of the first through fourth examples are collectively described below while comparing them with the prior art techniques.

1. Many floating magnetic heads have the CSS (constant start stop) system. Therefore, it is required that the CSS Performance be improved in such a way to prevent the surface of a magnetic recording medium from being damaged by the edge of the slider. Consequently, the material of the slider is selected to match the characteristics of the magnetic disk used. In the prior art floating magnetic head of the composite type, the magnetic head core is inserted in the slit.

Therefore, the selection of the material of the magnetic head core, the material of the slider, and the material of the loaded glass are important from the point of thermal expansion coefficient.

In the novel floating magnetic head, the magnetic head core is mounted on a side of the slider and so it is only necessary that the material of the slider be selected to meet the performance of CSS characteristics.

Hence, the material and the structure of the magnetic head core can be selected from a great choice of materials and structures. For instance, a magnetic head core comprising laminated magnetic thin-metal films can also be employed.

2. In the prior art composite type, a magnetic head core is inserted into a narrow slit in the slider and bonded via glass. To improve the fluidity of the glass, it is necessary to melt it at a high temperature and to cause it to flow into the slit. This means that the high-temperature glass erodes the magnetic head core. Especially, those portions of the magnetic core which are located on the side of the entrance of the slit are exposed to a large amount of glass. These portions which determine the track width of the magnetic head core on the side of the entrance are affected greatly. This restricts the selection of the material of the magnetic head core. In the novel floating magnetic head of the present invention, the magnetic head core is less eroded by the glass because of the structure. Consequently, even those core materials which are easily eroded can be used.

3. In the second and third examples, the machining operation for determining the track width of the magnetic head is performed after mounting the magnetic head core on the slider. Therefore, during the manufacturing process, the core is less damaged than in the fabrication of the prior art composite-type floating magnetic head in which a very thin core having a machined track width is inserted into the slit.

4. Further, in the second and third examples, since the track width can be machined in the final step, commercial products having different track widths can be manufactured as one lot until the step for machining the track widths is carried out.

5. It is not necessary to lap both sides like the prior art composite-type floating magnetic head; it suffices to lap only one side.

6. Because of the features 4 and 5 described above, the novel magnetic head of the present invention gives more flexibility in constructing the production line than the prior art composite-type floating magnetic head.

7. In the prior art composite-type floating magnetic head, the magnetic head core is inserted into the slit in the slider. A glass which is melted and fluidized at a high temperature is passed into the slit to mount the magnetic head core and the slider. Then, the surface of the slider is lapped. This lapping operation varies the track width. Accordingly, the track width of the magnetic head core is machined, taking account of the lapping operation performed after the core is mounted on the conventional composite-type slider. Then, the core is mounted in the slit formed in the slider. In this method, the accuracy of the track width presents problems. In the novel floating magnetic head of the present invention, the track width is machined after the core is mounted on the slider and, therefore, the track width can be machined accurately.

8. In the novel floating magnetic head of the present invention, the material which bonds together the magnetic head core and the slider is very thin and hence is hardly exposed to the air bearing surface. Consequently, a recess due to glass erosion on lapping is not produced. Also, the material is hardly exposed. Hence, the reliability is high. For the same reasons, an aqueous detergent can be used in head cleaning operations.

9. Since the amount of the glass used to mount the magnetic head core and the slider is very small, the magnetic head is hardly affected by the bond distortion. Therefore, the reading and writing efficiency does not deteriorate. In addition, since bonding can be carried out at lower temperature, a head core having low heat-durability can be used.

10. One side of the magnetic head core is bonded to the slider, while the other slide is exposed and subjected to air flow. Therefore, the heat generated by the writing current can be dissipated more quickly than in the case of the prior art composite-type floating magnetic head.

11. The depth of the R/W gap is not measured via the sealing glass, unlike the prior art composite-type floating magnetic head. The depth of the R/W gap can be readily adjusted by machining and the measurement can be performed accurately.

12. In the fourth example, since coils can be wound on both legs of the magnetic head core, the effect of an external disturbing magnetic field can be cancelled out by the coils.

13. The magnetic head core can be made thinner than the prior art composite-type magnetic floating head core and monolithic floating magnetic heads. Hence, the novel magnetic head is less affected by an extraneous disturbing electromagnetic field produced by an electric motor, for example.

14. The slider can be made of an electrically conductive material, a material having a high magnetic permeability, or the like. Therefore, the effect of the extraneous disturbing electromagnetic field can be reduced by the shielding effect.

15. In the novel floating magnetic head of the present invention, the magnetic head core is mounted on the outside of the slider. This makes it possible to use the outermost portion of the magnetic disk.

16. Since the magnetic head core is mounted on the outside of the slider, it is easy to shunt the back gap by plating or sputtering of a magnetic material or by other methods. Therefore, the electromagnetic conversion efficiency of the magnetic head can be easily enhanced.

17. Metallization can be utilized in bonding together the slider and the magnetic head core. A slider material matching the selected material of the magnetic head core can be selected.

18. Because the magnetic head core is not inserted into the rail of the slider, the shape of the rail can be changed at will.

19. If necessary, an azimuth can be given to the magnetic head core, unlike a thin-film magnetic head and a monolithic magnetic head to reduce side reading.

Structure which achieve the second object described above are described hereinafter by referring to FIGS. 7–9. First, a fifth example of the floating magnetic head according to the invention is next described by referring to FIG. 7. Like components are indicated by like reference numerals in various figures and those components which have been already described will be not described below. FIG. 8 shows a sixth example.

Both examples can have balanced winding, in the same way as the example described in connection with FIG. 3. Their support members 18 are so shaped that they do not plug winding windows 20 in the magnetic head core 6. The support member 18 shown in FIG. 7 is made similar in shape to the magnetic head core 6 so as to match the core 6. In the floating magnetic head shown in FIG. 8, the support member 18 has a pair of flanges 16 and a pair of recesses 17 for winding.

Figure 7:
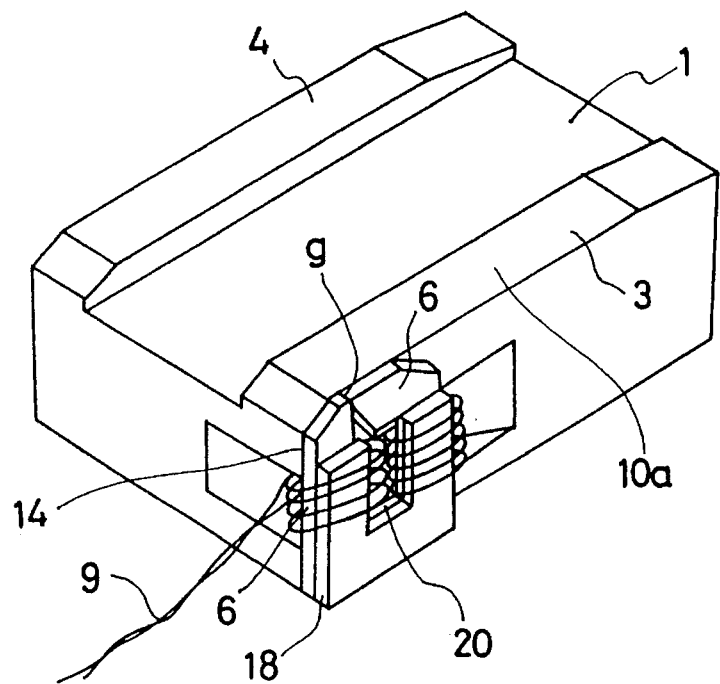
FIG. 7 is a perspective view of a fifth example of magnetic head according to the invention.
Figure 8:
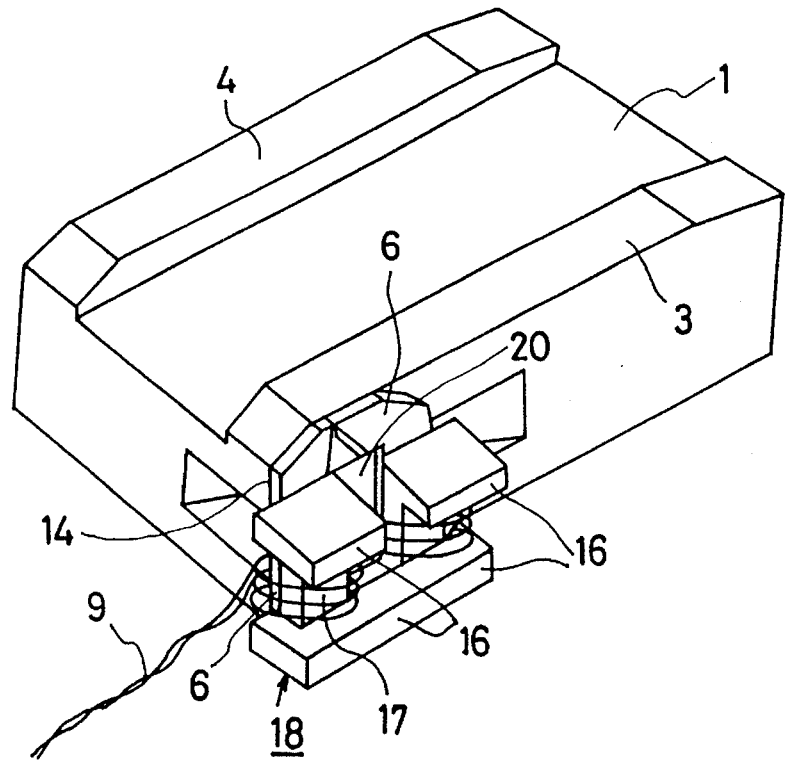
FIG. 8 is a perspective view of a sixth example of magnetic head according to the invention.

In the floating magnetic head shown in FIG. 7, the support member 18 is bonded to the magnetic head core 6 thereby to prevent damage to the magnetic head core 6 and deterioration in its characteristics. In the floating magnetic head shown in FIG. 8, damage to the magnetic head core 6 and deterioration in the characteristics are prevented by flanges 16. The portion of the winding 9 on the side of the support member 18 is received in the recess 17 formed by flanges 16. Therefore, the winding 9 is firmly held, and disarrangement of the winding is prevented. Hence, electrical leakage, breakage, and other troubles can be prevented.

Figure 9:
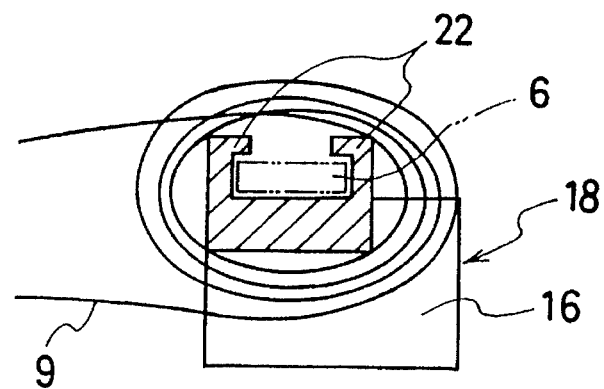
FIG. 9 is a cross-sectional view of the support member of the magnetic head shown in FIG. 8.

A modified example of the support member 18 of the sixth example of the invention is described by referring to FIG. 9.

In this floating magnetic head, a support member 18 has protrusions 22. A pair of flanges 16 are formed at opposite ends of the support member 18 and thus a winding recess 17 is formed between the flanges 16. A winding 9 is wound around the recess 17 and around the winding portion of the magnetic head core 6. In this floating magnetic head, the support member 18 is bonded to the magnetic head core 6. Thus, damage to the head core 6 and deterioration in the characteristics are prevented, in the same way as the floating magnetic head shown in FIG. 7. By the accommodation of the support member 18 of the winding 9 into a recess 17 (FIG. 8), the winding 9 is held firmly to prevent it from being deformed; thereby electrical leakage, breakage and other troubles can be prevented and the protrusions 22 prevent a rare short circuit due to a direct contact between the winding 9 and magnetic head core 6. The fifth and sixth examples of floating magnetic head according to the invention have the following advantages. The magnetic head core is reinforced with the support member.

Therefore, if a large force acts on the head core in a subsequent step such as winding of a coil or mounting to a suspension, the core can withstand the force. Consequently, the head core is prevented from becoming damaged.

Concomitantly, deterioration in the characteristics is prevented.

In the magnetic head of FIG. 8 and FIG. 9, a winding is wound around the winding recess in the support member and around the winding on the magnetic head core. That portion of the winding which is on the side of the support member is received in the winding recess and so the winding is firmly held. The winding is prevented from being disarranged. As a result, electrical leakage, breakage, and other troubles are prevented.

Where the support member and the slider are made of the same material, the support member and the magnetic head core expand thermally at the same rate. This reduces the distortion due to the bonding to the head core.

By constructing the support member in such a way that the apex 30 of the magnetic core is exposed, the surface facing the magnetic recording medium can be machined while watching the apex. This makes it possible to accurately adjust the depth of the R/W gap, i.e. the distance between the apex and the ABS surface.

A cover which is so shaped as to cover the corners of the winding on the magnetic head core is formed on the support member. The winding can be wound via the cover.

In consequence, the winding makes no direct contact with the sharp edge of the magnetic head core. The danger of layer short can thus be completely avoided.

A seventh example of the invention is described next by referring to FIG. 10 that is a fragmentary view of FIG. 1.

It is to be noted that like components are indicated by like reference numerals in FIGS. 1 and 3.

Figure 10:
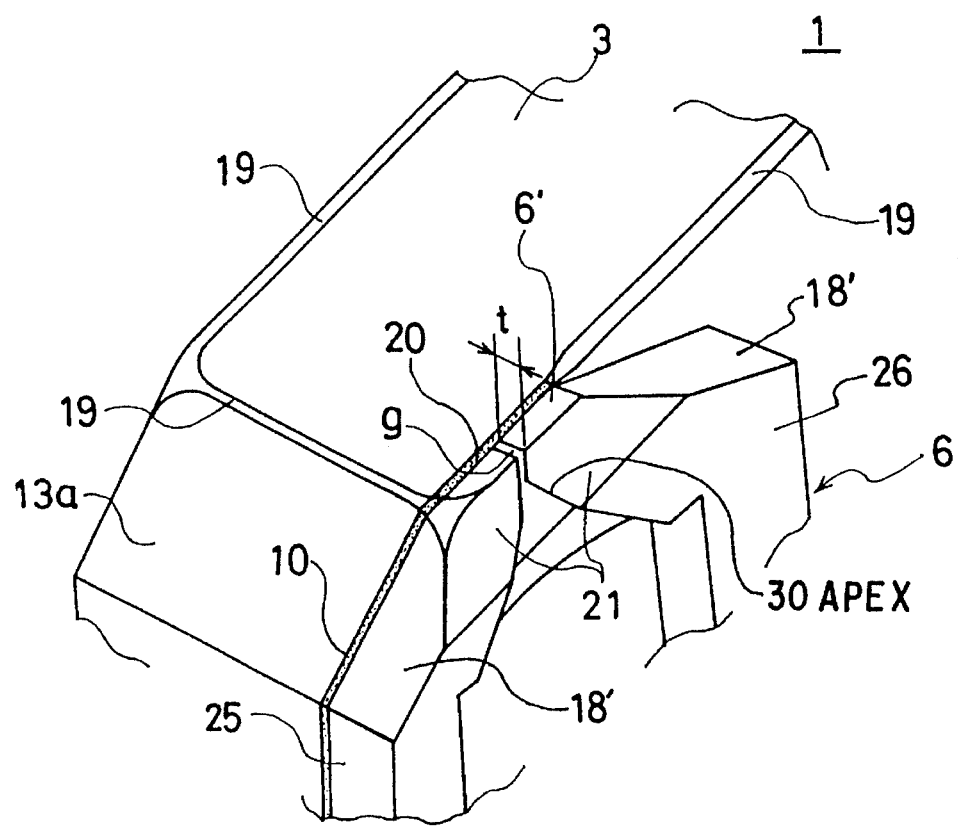
FIG. 10 is a perspective view of seventh example of magnetic head according to the invention.
Figure 11:
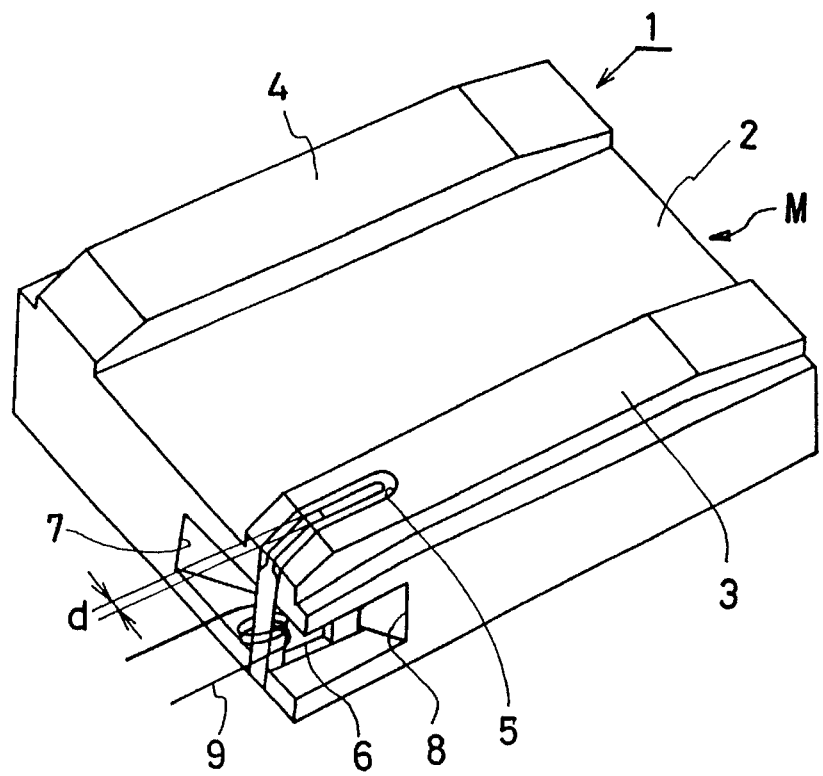
FIG. 11 is a perspective view of a conventional floating magnetic head.
Figure 12:
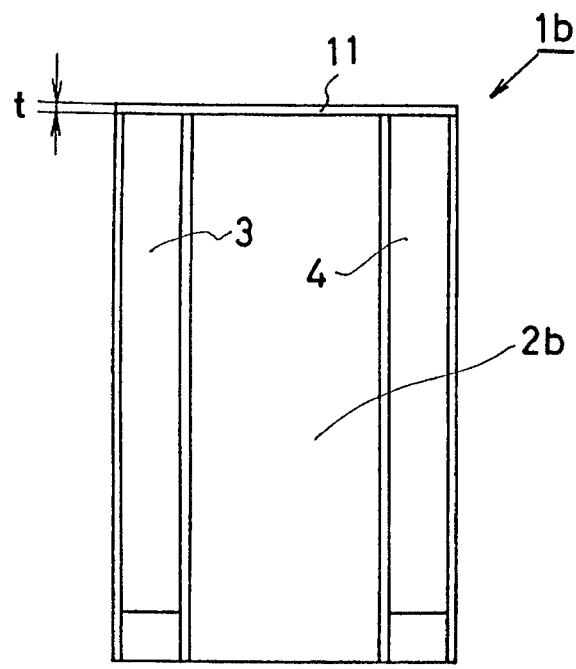
FIG. 12 is a plane view of a conventional floating magnetic head.

In FIG. 10, the floating magnetic head, indicated by numeral 1, comprises a substantially rectangular slider 2 made of a nonmagnetic material. The top surface of the slider 2 is opposite to a magnetic recording medium (not shown).

Rails 3 and 4 (only the rail 3 is shown) are mounted on the top surface to produce a floating force.

A magnetic head core 6 including a track portion 6' having a read/write gap g is bonded via a low-melting glass 10 to the end 13a of the rail 3 on the slider 2 from which air goes out of the magnetic head. The magnetic head core 6 is shorter than the slider 2. The magnetic head core 6 protrudes in such a way that the track portion 6' is located on the side of the rail 3. Since the magnetic head core 6 protrudes from the slider 2 in this way, the edge 19 of the rails 3 and 4 on the slider 2 are chamfered before defining the track width of the core 6. Therefore, the width t of the track portion 6' is not affected by chamfering the slider 2.

In this case, the bonding using the low-melting glass 10 is carried out by forming a low-melting glass film on the bonded surface of the slider 2 by sputtering techniques.

Alternatively, a film of the low-melting glass 10 may be formed on the bonded surface of the slider 2 by printing techniques to accomplish the bonding. In the present example, the magnetic head core 6 is bonded to the slider 2 via the low-melting glass 10. Instead of the low-melting glass 10, a low-melting metal or other adhesive may be employed.

The magnetic head core 6 is composed of two cores 25 and 26 which together form a substantially L-shaped form.

The cores 25 and 26 are made of a single crystal of MnZn ferrite, for example. In particular, the magnetic head core 6 is fabricated by forming magnetic films of Fe-Al-Si alloy on the surfaces of the cores 25 and 26 in which read/write gap g are to be formed, forming insulating films on the two magnetic films, bonding together the resulting two cores 25 and 26 via glass, and then cutting away the unwanted bonded portions. The inclined surface 18' of the two cores 25 and 26 forming the core 6 on the side of the air entrance 13a have been previously chamfered at an angle.

In the present example, the magnetic films of Fe-Al-Si alloy are formed on the surfaces of the cores 25 and 26 across which the read/write gap g located on the side of the rail 3 is formed. A magnetic film of Fe-Al-Si alloy may be formed only on one of the two surfaces. Also, in the above example, the two cores 25 and 26 are made of a single crystal of MnZn ferrite. These two cores may also be made of polycrystalline MnZn ferrite.

The slider 2 and the magnetic head core 6 are machined variously in the manner described below. These various machining operations are described below in connection with the procedure for fabricating the floating magnetic head 1.

First, the magnetic head core 6 is adhesively bonded to the slider 2. Then, the side of the slider 2 on the side of the air exit end 13a is chamfered at an angle. At the same time, the edges of the magnetic head core 6 on the side of the air exit end 13a are chamfered at an angle automatically.

Thereafter, the rails 3 and 4 on the slider 2 are lapped so that the depth of the read/write gap g in the magnetic head core 6 may assume a desired dimension.

Subsequently, the rails 3 and 4 on the slider 2 are lapped with lapping tape or the like to cut out the portion 20 of the rail 3 which is opposite to the track portion 6'. That is, the exposed edges 19 are chamfered with the lapping tape to round them.

When the edges 19 of the rails 3 and 4 on the slider 2 are chamfered with the lapping tape, the outer exposed edges of the magnetic head core 6 are also lapped. Then, the exposed outer upper portions of the magnetic head core 6 are ground to form inclined surfaces 21.

As a result, the track portion 6' of a given width (6 μm in the present example) is formed. The chamfered portions of the exposed outer edges of the core 6 have the inclined surfaces 21 because of the grinding operation described above and so the chamfered portions are abraded, and the track portion 61 of the desired width t is formed.

Consequently, it is unlikely that the track width t is affected by the tape lapping.

As described above, the exposed edges 19 of the rails 3 and 4, excluding the portion 20 opposite to the track portion 6', are chamfered. Therefore, if an operation of the CSS system is performed, the magnetic recording medium is not damaged by the edges 19. That is, the resistance to the CSS operation is improved. This enhances the reliability and can accommodate high-density recording.

In the floating magnetic head 1 shown in FIG. 2 or 3, if measures are taken to improve the resistance to the CSS operation, then the edges either of the slider 2 or of the magnetic head core 6 are chamfered and, at the same time, the track portion 6' is chamfered. As a result, the width t of the track portion 6' may decrease. In the novel floating magnetic head 1, the magnetic head core 6 protrudes from the slider 2. This makes it possible to chamfer the slider 2 independent of the magnetic head core 6. Hence, the problems intrinsic in the conventional floating magnetic head do not occur. In the present example, the magnetic head core 6 of a given width protrudes in a parallel relation to the rail 3.

However, the magnetic head core 6 protrudes over a quite small distance of 6 μm. Also, the air entrance end and air exit end 18', and the side 21 opposite to the slider forming the track width t of the magnetic head core are chamfered at an angle. Consequently, the core provides a very small area protruding from the rails 3 and 4. Furthermore, the magnetic head core is composed of surfaces forming only obtuse angles with respect to the surface opposite to the magnetic recording medium. In consequence, the resistance to the CSS operation is not adversely affected.

The seventh example of the invention is a floating magnetic head constructed as described thus far. The magnetic head core protrudes from the slider. Therefore, the edges of the surface of the core over which the medium floats can be chamfered without reducing the width of the track portion of the magnetic head core. Also, the exposed edges of the top surface of the slider are chamfered. Thus, if a CSS operation is performed, the edges do not damage the magnetic recording medium. Consequently, the resistance to the CSS operation can be improved securing a track portion of an appropriate width.

What is claimed is:

1. A floating magnetic head comprising:

a substantially rectangular slider having a top surface and a bottom surface having a floating surface, the slider made of a non-magnetic material and having leading and trailing ends said slider having side surfaces located between the top and bottom surfaces extending from the leading end to the trailing end, the slider being provided with a groove in one of said side surfaces which gradually increases in depth along one side of the slider extending toward the trailing end and has an opening at the trailing end;

rails mounted on the floating surface of the slider which is opposite to a magnetic recording medium to produce a floating force;

a magnetic head core being bonded to said one of the side surfaces of the slider external to the rails with a glass film which is formed on said one of the side surfaces of the slider;

the magnetic head core having first and second legs, the second leg being located at the trailing end of the slider without protruding from the trailing end such that the first leg is located between the second leg and the leading end of the slider, the magnetic head core having a read/write gap; and a first coil wound around the first leg in a first sense and a second coil wound around the second leg in a second sense opposite to the first sense, the first coil and second coil being connected in series, the first coil and the second coil being at least partially in the groove, wherein the length of the groove measured in the longitudinal direction of the slider is greater than the length of the magnetic head core measured in the longitudinal direction of the slider.

2. The floating magnetic head of claim 1, wherein the length of the magnetic head core along the longitudinal direction of the slider is more than one-tenth but no more than one-half of the length of the slider.

3. The floating magnetic head of claim 2, wherein the magnetic head core has an inclined face, the inclined face being close to a surface of one of the rails and opposite to the slider and magnetic head core bonding surface.

* * * * *